Nov. 14, 1967  L. J. BURANT ETAL  3,352,717
CATHODE FOR DEFERRED ACTION BATTERIES
Filed Sept. 19, 1963
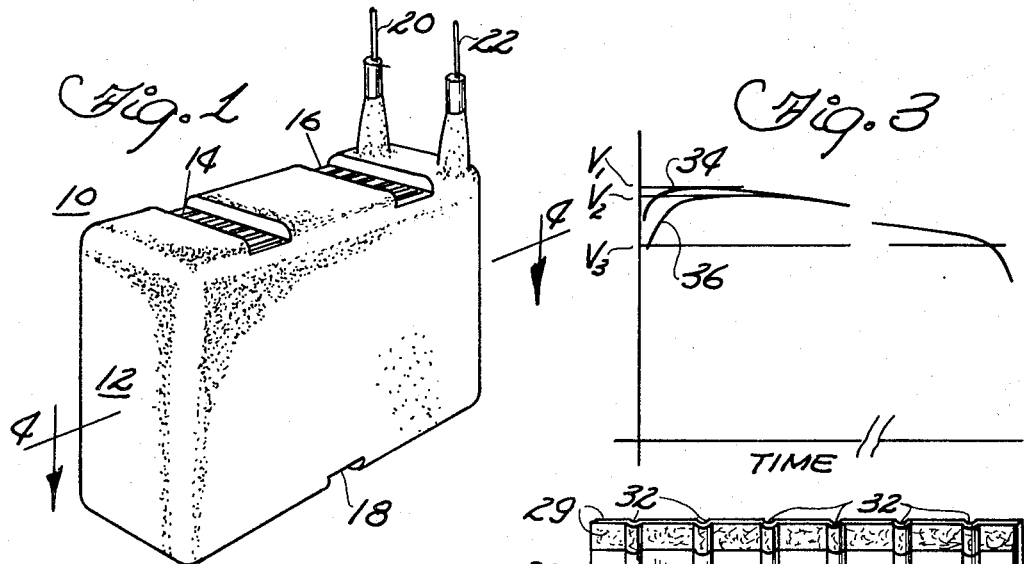
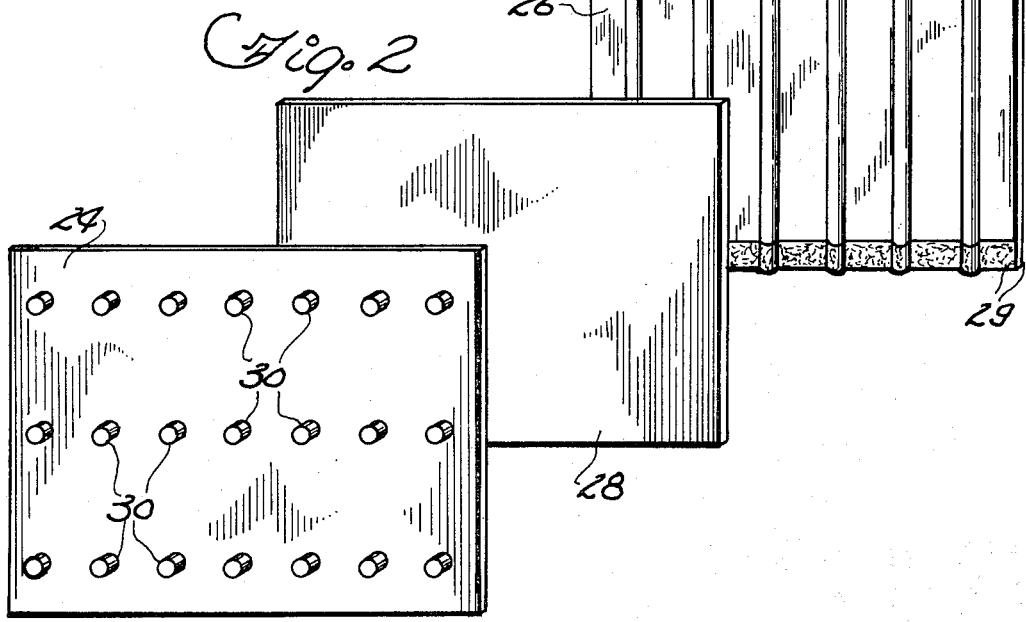
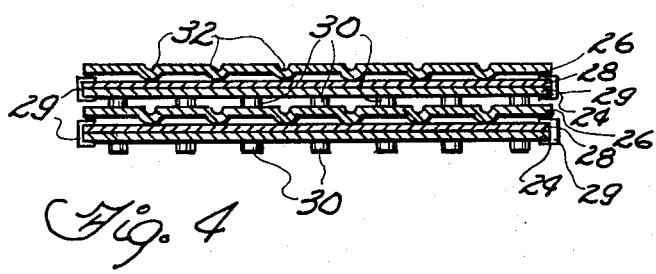
INVENTOR.
Leonard J. Burant
Kenneth R. Jones
Pendleton, Neuman,
Seibold & Williams
Atty's

United States Patent Office 3,352,717
Patented Nov. 14, 1967

3,352,717
CATHODE FOR DEFERRED ACTION BATTERIES
Leonard J. Burant, Milwaukee, and Kenneth R. Jones, Mequon, Wis., assignors to Globe-Union Inc., Milwaukee, Wis., a corporation of Delaware
Filed Sept. 19, 1963, Ser. No. 309,923
7 Claims. (Cl. 136—90)

This invention relates to deferred action batteries, and more particularly to deferred action batteries employing fused silver chloride as the cathode of each cell of the battery.

Such deferred action batteries commonly employ magnesium electrodes and are designed to be activated by introduction of an electrolyte such as salt water to the cells, whereupon the magnesium becomes negative in potential relative to the silver chloride. In order to reduce the drop in voltage caused by the silver chloride, which is a poor conductor, the exterior surfaces of the silver chloride electrode are reduced to silver, which is a good conductor. This reduces the voltage drop resulting from current flowing from the site of the chemical action on the silver chloride electrode to the opposed surface where contact is made with the next adjacent cell or a terminal connection.

Another voltage drop experienced during operation of the battery is attributable to the electrolyte itself which forms a part of the series circuit within the cells of the battery. In the better batteries of the deferred action type, the electrode spacing within the cells is very small so as to minimize this drop through the electrolyte and thereby add to the efficiency of the battery. In some cases, however, and particularly for moderate current loads, the time-voltage characteristic of the battery assumes a hump-shaped form, the maximum output voltage of the battery occurring at some time after energization. The rise in voltage is attributable to further reduction of the silver chloride cathode during the normal chemical reaction within the cell. In order to maximize the total energy output from each cell, pre-reduction of the silver chloride is kept at or near a minimum acceptable level. The subsequent drop in voltage occurs because of the electrode material taking part in the battery reaction and being consumed or converted to silver, thereby increasing the inter-electrode spacing and thus increasing the effective electrolyte resistance. This hump is not desirable in that the maximum voltage of the battery at the peak of the hump frequently exceeds the maximum voltage for which the equipment powered by the battery is designed.

Accordingly, it is the principal object of this invention to provide a deferred action battery with a voltage-time characteristic curve which is substantially flat during the life of the battery.

This achieves the advantage of reducing the differential between the maximum and minimum voltages during the life of the battery, and accordingly provides a battery having a voltage which is substantially constant through the life of the battery. This feature is important when the battery is used to power electronic circuits such as oscillators and the like, in which the frequency of oscillation is at least partially responsive to the level of the supply voltage.

These and other objects and advantages of the invention will become manifest upon examination of the specification and claims, and the accompanying drawings.

In one embodiment of the present invention there is provided a deferred action battery having, in each cell of the battery, a cathode formed of fused silver chloride, and an anode formed of magnesium. The cells are placed in tandem with a silver foil separator or the like between adjacent cells and in intimate, preferably welded contact with the magnesium. A relatively thin surface portion of the cathode is initially reduced to silver, and this provides the conductive path from the site of chemical action to the silver foil or other connection to the adjacent cell. The reduced silver provides an acceptable low resistance path which is reduced still further during operation. By selectively altering the reduced silver path from the site of chemical action to the connection to the next adjacent cell or terminal, a substantially improved operating characteristic can be obtained in accordance with this invention. When the battery is activated, a resistance is experienced because of the selectively located unreduced portion of the cathode surface thereby producing a voltage drop and lowering the battery output voltage. The battery current gradually reduces the unreduced portion of silver chloride, however, so that this resistance is gradually diminished during the initial action of the battery. The effect of decreasing resistance resulting from the reduction of the unreduced portion of the cathode overlaps in time the increasing resistance effect from increased electrode spacing, thus smoothing the voltage-time curve.

Reference will now be made to the drawings, in which:

FIG. 1 is a perspective view of a deferred action battery incorporating the present invention;

FIG. 2 is an exploded perspective view of one of the subassemblies of which the battery of FIG. 1 is constructed;

FIG. 3 is an illustration of a voltage-time characteristic curve representative of a prior art battery and of the battery of the present invention; and FIG. 4 is a partial cross-sectional view taken along the line 4—4 of FIG. 1.

Referring now to FIG. 1 of the drawings, there is illustrated a perspective view of a deferred action battery 10 constructed in accordance with the present invention. The battery 10 comprises an outer casing 12 of plastic or the like which serves to hold the internal elements of the battery readily in position with respect to each other, and also provides a certain amount of protection for the internal elements of the battery from damage due to outside mechanical forces.

The particular battery illustrtaed in FIG. 1 is of the type which employs salt water as an electrolyte, and the battery is energized by immersing it in sea water or the like whereupon the electrolyte enters the interstices through a plurality of ports 14, 16 and 18 and particularly bottom port 18. The ports 14 and 16 are located at the top of the battery, as illustrated in FIG. 1, at opposite ends thereof, while the port 18 is located in the mid-portion of the bottom of the battery as illustrated in FIG. 1. The electrolytic action develops a gas within the battery which induces the flow of sea water up through port 18, through all of the cells, and out through ports 14 and 16.

A pair of electrical leads 20 and 22 extend outwardly through the wall of the casing 12, and may be connected to an electrical apparatus desired to be powered by the battery.

The battery illustrated in FIG. 1 is made up of a plurality of subassemblies, one of which is indicated in exploded form in FIG. 2. Each of the subassemblies includes an anode electrode 24, a cathode electrode 26 and a partition 28 disposed intermediate the anode and cathode electrodes. Each anode 24 may be secured to its partition 28 by a strip of tape 29 (FIG. 4), and the convex surface of grooves 32 of each cathode may be cemented to its partition to form a subassembly. In the described embodiment of the invention, the anode 24 is preferably composed of magnesium, the cathode 26 is preferably composed of silver chloride, and the partition 28 is a thin silver foil. A plurality of spacers 30 are attached to one surface of the anode electrode 24 and serve to separate the anode and cathode electrodes within each cell when the subassemblies are assembled into a completed battery. It should be noted that in the subassembly the anode and cathode are not parts of a single cell.

The anode 24 and the cathode 26 of each subassembly comprise the anode 24 of one cell and the cathode 26 of an adjacent cell, adjacent cells being separated by the partition 28. It is necessary that the partition 28 be impervious to the electrolyte used in the battery to avoid electrolytic action between the anode 24 and cathode 26 of adjacent cells which are separated by a partition 28. The partition 28 also serves as an internal electrical conection between adjacent cells of the battery so that the voltage of adjacent cells is in a series additive relationship. The number of subassemblies which are employed to make up a completed battery depends upon the final voltage which is desired from the battery.

The cathode electrode 26 is provided with a number of parallel generally vertical grooves 32 disposed in substantially equally spaced arrangement over its surface. The grooves 32 are positioned in the cathode 26 such that they open toward the anode of the cell in which the cathode 26 is disposed. The convex surface of the grooves 32 face toward the partition 28 and are in contact therewith.

Referring now to FIG. 3, there is illustrated a voltage-time characteristic curve 34 of a prior art deferred action battery, for a moderate constant current. The second curve 36 represents the voltage-time characteristic curve of the battery of the present invention, and it is seen that the characteristic curve of the present invention provides a more constant voltage throughout the battery life, until just before the exhaustion of the battery. This result is attained by the improved construction of the cathode electrode 26 whereby the internal battery resistance is increased during the initial portion of the battery operation.

The improved cathode 26 of the present invention is formed of silver chloride, and, its surface, except for portions 29 on its edges, is reduced by chemical action to substantially pure silver. The reduction may take place either by immersing the cathode 26 in a reducing bath, or by subjecting it to electrolytic action by passing the current therethrough while the cathode 26 is immersed in a reducing solution. In either method, the portions 29 of the surface of the cathode 26 facing the partition 28 are first masked by applying thereto a layer of material which is impervious to the solution in which the electrode is immersed during reduction. Such a mask is preferably formed from plastic insulating tape such as Mylar or the like, which will not permit an electrical current to flow therethrough and is not readily attacked by the chemical solutions employed during reduction of the cathode. The result after the reducing step is a cathode electrode 26 which has a portion of its surface reduced to substantially pure silver while retaining another portion of its surface in the form of silver chloride which has a very high resistivity. An alternative method is to reduce the entire surface area of the electrode, as in the prior art, and then remove the silver coating from the portions 29. In the embodiment illustrated, the portions 29 are disposed at two of the edges of the electrode. It will be understood that the unreduced silver chloride portions 29 may be located on any number of edges, or on the surface of the electrode facing the partition 28, provided only that they are so located that they increase the effective resistance between the site of chemical action and the connection to an adjacent cell or terminal. It has been found, however, that the edges of the cathode 28 are the most effective places for the location of the silver chloride portions 29, since the silver coating of the cathode serves as a part of the electrical interconnection between adjacent cells, and the battery current must therefore flow through the conductive coating at the edges of the cathode.

When the battery is operated, the electrolytic action taking place within each cell functions to reduce the silver chloride of the cathode 26 to silver, thereby reducing the internal resistance of the battery, and manifesting an increase in voltage due to such reduction. The relatively large area of unreduced silver chloride on the surface of the cathode 26, however, effectively increases the time during which the internal resistance of the battery decreases. Thus, the voltage rises with time, as the cathode material is reduced, but, due to the controlled relationship between the two resistance variables discussed above, the peak output voltage produced by the battery is much less. When the silver chloride has been substantially reduced in use, the two curves 34 and 36 become identical. This, however, does not occur until after the electrolyte resistance begins to increase. Thus, the time relationship of the two phenomena which affect the voltage-time characteristic curve of the battery is altered to cause more overlapping in their occurrence, and, as these two phenomena tend to produce opposite slopes in the characteristic curve, the curve is rendered substantially flatter than is the case with prior art batteries.

The term "flatter," as used herein, refers to the feature whereby the maximum and minimum output voltages of the battery are closer together. Thus, in the curve 34, the maximum voltage is $V_1$, and the minimum voltage (which occurs just before the steeper portion of the curve prior to exhaustion) is $V_3$. In the improved curve 36, the minimum voltage $V_3$ is the same, while the maximum voltage $V_2$ is less than $V_1$, and the curve is therefore "flatter." Although the initial voltage of the curve 36 is less than that of the curve 34, this is not a disadvantage as long as it is at least as large as the minimum voltage $V_3$. In fact, the maximum flatness exists where the initial voltage of the curve 36 is equal to the minimum voltage $V_3$.

It should be appreciated that the improved cathode construction of the present invention is designed primarily for use with moderate loads, which draw moderate amounts of current from the battery. For very light loads, the resistance of the silver chloride and the electrolyte are much smaller than the load resistance and therefore produce no significant voltage drop. Thus, the initial portion of the characteristic curve of the battery is substantially flat notwithstanding the further reducion of the silver chloride material of the cathode. Conversely, for very large currents flowing through the battery, the resistance of the electrolyte is sufficient alone to drop the battery voltage below the maximum voltage requirements of the equipment employed with the maximum voltage requirements of the equipment employed with the battery.

It should be noted that although the problem solved by the present invention does not arise except for moderate amounts of current flow, nevertheless, when a battery is desired to be employed for a relatively short period of time, the most desirable operating condition of the battery is with a moderate current drain. One specific example of such an instance is when the battery is used for powering the electrical equipment within a sonobuoy, where power is required for a relatively short interval extending only up to several hours, after which it is no longer needed. In such an application, if a battery size is selected which cooperates with the load to cause only a small fraction of the current capacity of the battery to flow, the battery will last much longer than is required, which is inefficient in that a smaller size and, therefore, less costly battery could be employed. Similarly, when the battery is operated near its maximum current capability, the battery may be discharged completely before the need for electrical power ends. It is therefore evident that the most propitious operating point of such equipment is at a moderate amount of current, where the present invention has its greatest utility.

The foregoing will so fully and completely explain the character of the present invention that others may, by applying current knowledge, readily adapt the same for use under varying conditions of service without departing from the essential features of novelty which are intended to be defined and secured by the appending claims.

What is claimed is:

1. In a deferred action battery having a cell with anode and cathode electrodes, said cathode electrode being formed of a first material which is reduced to a second material having less resistivity during operation of said cell, the improvement in combination therewith comprising a cathode electrode having a portion of its surface formed of said first material and the remainder of its surface formed of said second material, whereby said battery exhibits a substantially flat voltage-time characteristic for moderate battery currents within the current capacity of said battery.

2. In combination with a deferred action battery, an improved cathode comprising a first surface portion of a first material, and a second surface portion contiguous with said first surface portion, formed of a second material having less resistivity than said first material, said second material being a reduction product of said first material formed when current is passed through said cell during use, whereby the internal resistance of said cathode is lowered during use, and said battery exhibits a substantially flat voltage-time characteristic for moderate battery currents within the current capacity of said battery.

3. In combination with a deferred action battery, a substantially planar electrode formed of silver chloride, with a portion of the surface of said electrode being reduced to silver, and the remainder of the surface of said electrode being silver chloride, whereby said battery exhibits a substantially flat voltage-time characteristic for moderate battery currents within the current capacity of said battery.

4. In combination with a deferred action battery having a cell with anode and cathode electrodes, one of said electrodes having a first portion of one surface formed of silver chloride and a second portion of said surface formed of conductive material, said first portion of said surface being opposite the portion of said one electrode nearest the other of said electrodes, whereby said battery exhibits a substantially flat voltage-time characteristic for moderate battery currents within the current capacity of said battery.

5. A deferred action battery exhibiting a substantially flat voltage-time characteristic for moderate battery currents within the current capacity of said battery, comprising in combination therewith a cell having anode and cathode electrodes, a quantity of electrolyte within said cell and in contact with the surfaces of said electrodes which face each other, said electrolyte increasing in resistivity as said cell is used to tend to reduce the output voltage of said battery with time, one of said electrodes being composed of a first material which is transformed into a more conductive material by the battery reaction to tend to increase the output voltage with time, a conductive member juxtaposed with a second surface of said one electrode opposite said facing surface of said one electrode, said second surface of said one electrode being partially formed of said more conductive material and the remainder of said second surface being formed of said first material.

6. In combination with a deferred action battery having a cell with substantially planar anode and cathode electrodes and a reactive area therebetween for receiving an electrolyte, said cathode being formed of a first material which is reduced to a second material having less resistivity than said first material during the operation of said cell, and a planar conductive member juxtaposed with said cathode on one side thereof opposite said reactive area and contacting said cathode at a plurality of places distributed over a substantial portion of the area of said cathode for collecting current from said cathode, the improvement comprising a portion of said one side of said cathode electrode contacting said planar conductive member being formed of said first material and the remainder of said one side being formed of said second material, whereby said battery exhibits a substantially flat voltage-time characteristic for moderate battery currents within the current capacity of said battery.

7. The battery according to claim 6, wherein said first material is silver chloride and said second material is silver.

References Cited

UNITED STATES PATENTS

| | | | |
|---|---|---|---|
| 2,988,587 | 6/1961 | Haring | 136—90 |
| 3,007,993 | 11/1961 | Haring | 136—100 |
| 3,123,504 | 3/1964 | Schilke | 136—10 X |
| 3,184,339 | 5/1965 | Ellis | 136—75 |
| 3,185,591 | 5/1965 | Bartfai et al. | 136—75 |
| 3,189,486 | 6/1965 | Pryor et al. | 136—100 |

WINSTON A. DOUGLAS, *Primary Examiner.*

B. J. OHLENDORF, A. SKAPARS, *Assistant Examiners.*

UNITED STATES PATENT OFFICE
CERTIFICATE OF CORRECTION

Patent No. 3,352,717                          November 14, 1967

Leonard J. Burant et al.

It is hereby certified that error appears in the above numbered patent requiring correction and that the said Letters Patent should read as corrected below.

Column 3, line 12, for "conection" read -- connection --; column 4, line 44, for "reducion" read -- reduction --; lines 49 and 50, strike out "maximum voltage requirements of the equipment employed with the".

Signed and sealed this 14th day of January 1969.

(SEAL)
Attest:

Edward M. Fletcher, Jr.                          EDWARD J. BRENNER

Attesting Officer                                  Commissioner of Patents